No. 751,231. Patented February 2, 1904.

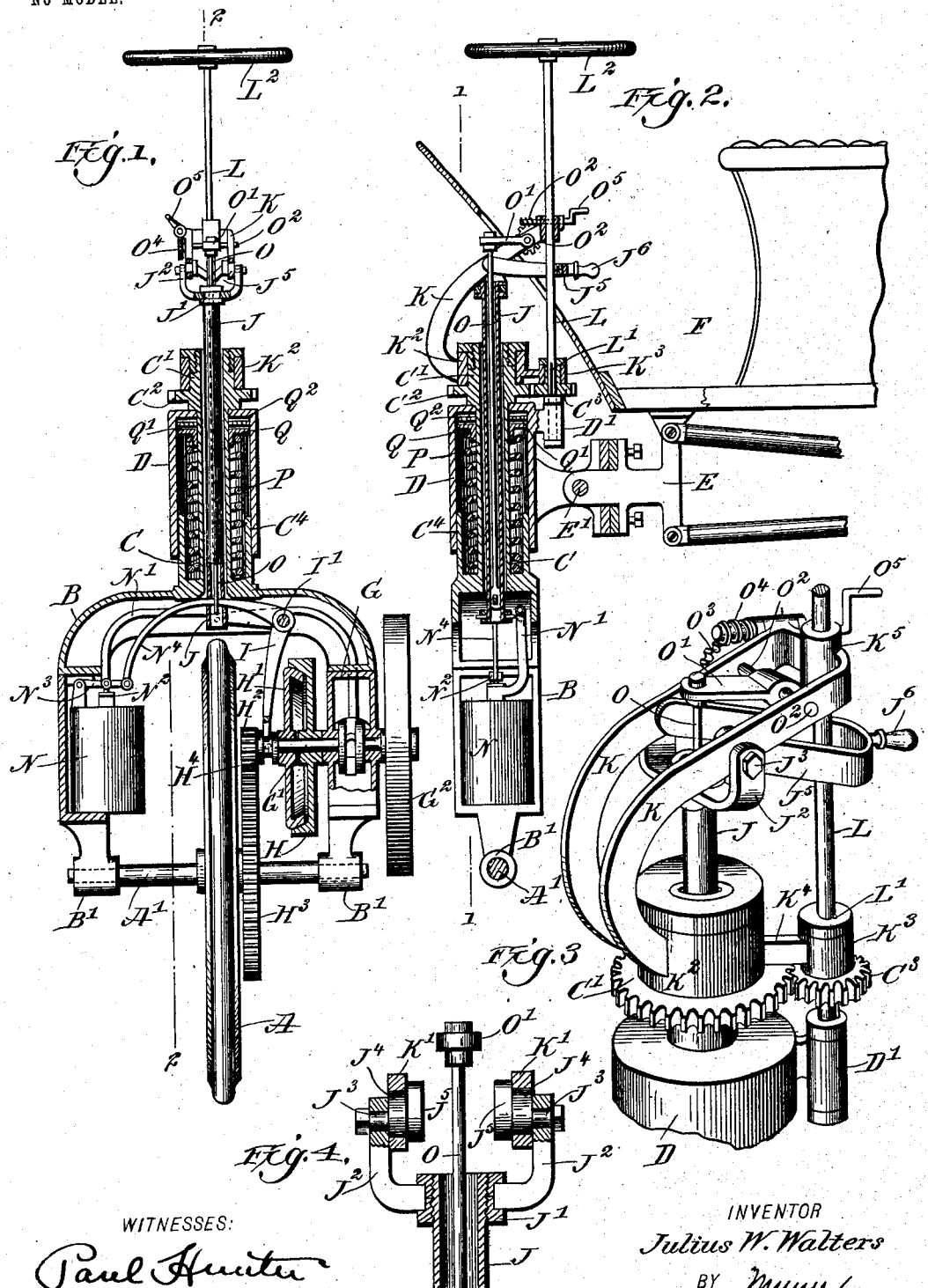

UNITED STATES PATENT OFFICE.

JULIUS WM. WALTERS, OF NEW YORK, N. Y.

MOTOR-WHEEL FOR VEHICLES.

SPECIFICATION forming part of Letters Patent No. 751,231, dated February 2, 1904.

Application filed June 9, 1903. Serial No. 160,723. (No model.)

*To all whom it may concern:*

Be it known that I, JULIUS WILLIAM WALTERS, a citizen of the United States, residing in the city of New York, borough of Manhattan, in the county and State of New York, have invented a new and Improved Motor-Wheel for Vehicles, of which the following is a full, clear, and exact description.

The invention relates to motor-wheels for vehicles, such as shown and described in the Letters Patent of the United States, Nos. 624,414 and 635,620, granted to me on May 2, and October 24, 1899, respectively.

The object of the present invention is to provide certain new and useful improvements in motor-wheels for vehicles whereby the operating mechanism is greatly simplified to insure a quick handling of the vehicle by the operator when starting or stopping the motor, as well as when propelling and steering the vehicle.

Further objects and advantages of the invention will appear in the course of the subjoined description, and the novelty will be defined by the annexed claims.

Reference is to be had to the accompanying drawings, forming a part of this specification, in which similar characters of reference indicate corresponding parts in all the figures.

Figure 1 is a transverse section of the improvement on the line 1 1 in Fig. 2. Fig. 2 is a sectional side elevation of the same on the line 2 2 in Fig. 1. Fig. 3 is an enlarged perspective view of part of the improvement, and Fig. 4 is an enlarged cross-section of the upper end of the steering-post.

The wheel A to be driven and turned for propelling and steering the vehicle has its shaft A' mounted to rotate in bearings B', carried on the lower end of the steering-fork B, having a tubular steering-post C, extending through and mounted to turn in a steering-head D, pivotally connected at E' to a support E, carried by the vehicle-body F, preferably at the under side thereof at the front end, as indicated in Fig. 2.

On one member of the steering-fork B is arranged a motor proper, G, preferably a gas-engine, having its main shaft G' journaled in suitable bearings in the members of the fork and provided at the outer end with a fly-wheel $G^2$ and on the inside of the fork with a friction-wheel H, adapted to be engaged by a friction-wheel H', mounted to rotate loosely on the shaft G' and adapted to slide longitudinally thereon. On the hub of the friction-wheel H' is secured a pinion $H^2$ in mesh with a gear-wheel $H^3$, secured on the shaft A' or on the web of the wheel A, so that when the pinion $H^2$ is rotated a rotary motion is transmitted by the gear-wheel $H^3$ to the wheel A to propel the vehicle forward. It is understood that the said wheels H H' and connected parts form a clutch mechanism; but it is evident that I may substitute other clutch mechanism for the same, if desired.

The hub of the friction-wheel H' is provided with an annular recess $H^4$, engaged by a shifting-fork I in the form of a bell-crank lever and fulcrumed at I' on the fork B, the horizontal member of the bell-crank lever being pivotally connected to the lower end of a tube J, which extends upward through the hollow steering-post C, as is plainly indicated in Figs. 2 and 3. The upper end of the tube J carries a collar J', on which is mounted to turn a yoke $J^2$, engaging pins $J^3$, eccentrically arranged in disks $J^4$, mounted to turn in bearings K', formed in a frame K, having its lower end in the form of a ring $K^2$, mounted to turn on the upper end C' of the steering-post C. The disks $J^4$ are attached to the ends of a fork $J^5$, having a handle $J^6$, extending rearwardly and within convenient reach of the operator seated on the vehicle-body to allow the operator to swing the fork $J^5$ up or down, so as to turn the disks $J^4$ and cause the pins $J^3$ thereof to raise or lower the yoke $J^2$, and consequently move the tube J in a like direction. When the tube J is moved downward, then a swinging motion is given to the shifting-fork I to cause the latter to move the friction-wheel H' to the right into engagement with the friction-wheel H, so that the rotary motion of the latter is transmitted to the said friction-wheel H' and to the pinion $H^2$ to rotate the gear-wheel $H^3$ and turn the wheel A to propel the vehicle forward. When the tube J is moved in an upward direction, then the shifting-fork I slides the wheel H' inward out of mesh with the friction-wheel H, and consequently the rotary motion of said friction-wheel H ceases, while the wheel H may still run—that is, as long as the motor G is left in action.

In order to turn the steering-fork B to swing the vehicle to the right or left, the following device is provided: In the steering-post C between the top of the steering-head D and the ring $K^2$ is secured or formed a gear-wheel $C^2$ in mesh with a gear-wheel $C^3$, having a keyway engaged by a key $L'$, secured on a steering-shaft L, mounted to turn at its lower end in a suitable bearing $D'$, carried by the steering-head D. On the upper end of the shaft L is secured a hand-wheel $L^2$ under the control of the operator seated on the vehicle-body F, so that when the wheel $L^2$ is turned the gear-wheel $C^3$ is rotated, and with it the gear-wheel $C^2$, and as the latter is attached to the steering-post C it is evident that the fork B is turned, and with it the shaft $A'$ and wheel A, to steer the wheel either to the right or to the left, according to the direction in which the wheel $L^2$ is turned. The hub of the gear-wheel $C^3$ is formed with an annular recess engaged by a ring $K^3$, connected by a bar $K^4$ with the ring $K^2$ of the frame K, and the upper end of the latter is formed with a hub $K^5$ loosely engaging the shaft L a suitable distance above the ring $K^3$, as is plainly indicated in the drawings.

By the arrangement described the steering-post C in sliding vertically in the steering-head D still keeps its gear-wheel $C^2$ in mesh at all times with the gear-wheel $C^3$, as the latter is carried by the ring $K^3$, which forms a part of the frame K, and the latter is carried on the upper end of the steering-post C, so as to move with the same.

On the member of the steering-fork B, opposite the one carrying the member G, is held a motive-agent reservoir N, connected by a pipe $N'$ with the motor G, so as to supply the latter with the necessary motive agent for actuating the motor. The amount of motive agent passing through the pipe $N'$ to the member is regulated by a valve $N^2$, held on a lever $N^3$, fulcrumed on the reservoir N, as is plainly illustrated in Fig. 1, and the free end of said lever $N^3$ is pivotally connected with an arm $N^4$, mounted to swing on the pivot $I'$ as the fulcrum. The arm passes at or near its middle through an eye on the lower end of a rod O, which extends loosely up through the tube J, and the upper end of said rod O is connected with the free end of an arm $O'$, projecting forwardly from a shaft $O^2$, journaled in suitable bearings in the frame K. On the shaft $O^2$ is secured a worm-wheel $O^3$ in mesh with a worm $O^4$, journaled on the frame K and having a crank-arm $O^5$ within the reach of the operator to permit the latter to turn the said worm $O^4$ and rotate the worm-wheel $O^3$ and shaft $O^2$ to impart an up or down swinging motion to the arm $O'$, according to the direction in which the crank-arm $O^5$ is turned. When the arm $O'$ swings upward, the rod O is lifted, and the arm $N^4$ is swung upward to move the lever $N^3$ in a like direction, so as to open the valve $N^2$ more or less to allow the motive agent to pass to the motor G. When the arm $O'$ swings downward, then the rod O moves in a like direction and imparts a downward swinging motion to the arm $N^4$ and to the lever $N^3$, so as to close the valve $N^2$, and thereby shut off the motive agent from the motor G to stop the latter.

As illustrated in Figs. 1 and 2, the steering-head D fits at its lower end over a cylindrical extension $C^4$, projecting upwardly from the fork B concentric to the steering-post C. Around the latter is coiled a spring P, which extends at its lower end into said extension $C^4$ and rests on the bottom thereof, the upper end of the spring extending into the steering-head D and resting at the upper end on a disk Q, connected by a ball-bearing $Q'$ with a plate $Q^2$, abutting against the top of the steering-head, as is plainly illustrated in Figs. 1 and 2. By the arrangement described a yielding connection is made by the spring P between the steering-head and the fork, so that when the wheel A passes over rough or uneven surfaces the spring P will yield and take up the jar or shock without transmitting the same to the vehicle, so as to insure an easy riding therein.

From the foregoing it is evident that the tube for operating the stopping and starting mechism extends centrally through the steering-post and the rod for operating the motive-agent-supply valve extends centrally through the said tube and the post. The tube and rod have independent movement one of the other, the tube and rod being connected at their upper ends with the manually-operated devices carried by the frame, which is held against rotation. Thus the tube and rod can be readily raised or lowered and the steering-post can be turned for steering the vehicle without interfering in the least with either the valve-operating mechanism or the stopping and starting mechanism.

Having thus described my invention, I claim as new and desire to secure by Letters Patent—

1. A motor-wheel for vehicles, having a hollow steering-post, a vertically-movable tube within said post to operate the stopping and starting mechanism, and a vertically-movable rod extending centrally through the said tube to connect with the motive-agent-supply valve, the said post, tube and rod having independent movement one of the other at a common axis, as set forth.

2. A motor-wheel for vehicles, having a hollow steering-post, a tube within the said post and connected at its lower end with the stopping and starting mechanism, and a rod extending centrally through the said tube and connected at its lower end with the motiveagent-supply valve, the said post, tube and rod having independent movement one of the other, and the upper ends of the said tube and rod having connection with a manually-operated mechanism held against rotation, substantially as shown and described.

3. A motor-wheel for vehicles, comprising a wheel proper, a fork in which the wheel is journaled, a motor carried by the fork, a driving-gear connecting the motor with the said wheel, the driving-gear having a stopping and starting mechanism extending through the hollow steering-post and the said fork, and a motive-agent supply carried by the fork, and having a valve for regulating the amount of motive agent passing to the said motor, the operating mechanism for the said valve extending, with that of the said stopping and starting mechanism, through the said steering-post, substantially as shown and described.

4. A motor-wheel for vehicles, comprising a wheel proper, a fork in which the wheel is journaled, a hollow steering-post for the said fork, a steering-head held from turning and in which the said steering-post is mounted to turn, means carried by said head for turning said post, a driving-gear having a stopping and starting mechanism with a tube extending through the said steering-post, and a valve for regulating the supply of motive agent to the motor and having its operating mechanism extending through said steering-post within the said tube of the stopping and starting mechanism, substantially as shown and described.

5. A motor-wheel for vehicles, having a wheel proper, a fork in which the wheel is journaled, the fork having a hollow steering-post, a steering-head pivotally connected with the vehicle-body and in which the said post is mounted to turn, the said steering-head being in axial alinement with the vertical axis of the wheel, and means carried by the steering-head for turning said post; the said hollow steering-post forming a passage for the valve-operating mechanism of the motive-agent supply and for the stopping and starting mechanism for the driving-gear, substantially as shown and described.

6. A motor-wheel for vehicles, having a wheel proper and a fork in which the wheel is journaled, the fork having a hollow steering-post, a pivoted steering-head carried by the vehicle and in which the steering-post is mounted to turn, the said steering-head being in axial alinement with the vertical axis of the wheel, mechanism for operating the valve of the motive-agent supply, mechanism for stopping and starting the driving-gear, the said mechanisms having vertically-movable parts extending through the hollow steering-post, and means connected with the upper ends of said parts for actuating the same, substantially as shown and described.

7. A motor-wheel for motor-vehicles, having a steering device for the steering-post, and comprising a gear-wheel on the steering-post, a shaft journaled on the steering-head, a second gear-wheel mounted to turn with and to slide on the said shaft and in mesh with the said steering-head gear-wheel, and means for moving the said second gear-wheel bodily with the steering-post, substantially as shown and described.

8. A motor-wheel for motor-vehicles, having a steering device for the steering-post, comprising a frame carried by the post and in which the post is free to turn, a gear-wheel secured on the post, a shaft, and a second gear-wheel mounted to turn with and to slide on said shaft and in mesh with said post gear-wheel, the said shaft having a bearing in the steering-head and in the said frame, substantially as shown and described.

9. A motor-wheel for motor-vehicles, having a steering-post mounted to turn in a steering-head carried by the vehicle, a steering device for the steering-post, and comprising a gear-wheel on the steering-post, a frame having its lower end in the form of a ring mounted to turn on the upper end of the steering-post, a shaft carrying a hand-wheel at its upper end and mounted to turn in bearings carried by the steering-head and the said frame, a second gear-wheel mounted to turn with and to slide on the said shaft and in mesh with the gear-wheel on the steering-post, and a ring engaging an annular recess in the hub of the said second gear-wheel and connected by a bar with the ring of the said frame, substantially as shown and described.

10. A motor-wheel for vehicles, having an actuating device for the stopping and starting mechanism, and comprising a tube connected with the shifting-fork of the said stopping and starting mechanism, and an eccentric device under the control of the operator, and connected with the said tube, to move the latter, substantially as shown and described.

11. A motor-wheel for vehicles, having an actuating device for the stopping and starting mechanism, and comprising a tube connected with the shifting-fork of the said stopping and starting mechanism, and an eccentric device under the control of the operator, and connected with the said tube, to move the latter, the said eccentric device comprising a yoke on the tube, a disk mounted to turn in a bearing, a pin eccentric on the disk and engaging the yoke, and a handle for turning the disk, substantially as shown and described.

12. A motor-wheel for vehicles, having a hollow steering-post, a clutch mechanism for bringing the motor into and out of service, an actuating device for the clutch mechanism, and comprising a tube connected at its lower end with the shifting-fork of the said clutch mechanism, the said tube extending through the steering-post and having vertical movement, and a device under the control of the operator and connected with the upper end of said tube, to move the latter, substantially as shown and described.

13. A motor-wheel for vehicles, having an operating mechanism for the valve controlling the motive agent, the said mechanism comprising a pivoted arm connected with the valve, a rod engaging the said arm and extending centrally through the steering-post, a shaft carrying an arm engaging the said rod, a worm-wheel on the said shaft, and a worm under the control of the operator, and engaging the said worm-wheel, substantially as shown and described.

14. A motor-wheel for vehicles, having an operating mechanism for the valve controlling the motive agent, the said mechanism comprising a lever connected with the valve, an arm mounted to swing and pivotally connected with the free end of said lever, a rod having its lower end engaging the said arm, the said rod extending centrally through the steering-post, a shaft carrying an arm engaging the upper end of said rod, and means under the control of the operator, for turning said shaft, substantially as shown and described.

In testimony whereof I have signed my name to this specification in the presence of two subscribing witnesses.

JULIUS WM. WALTERS.

Witnesses:
   JNO. M. RITTER,
   H. T. BERNHARD.